United States Patent
Schmitt (10) Patent No.: US 10,626,631 B2
(45) Date of Patent: Apr. 21, 2020

(54) POOL CLEANER DRIVE MECHANISM (71) Applicant: INTEGRATED POOL PRODUCTS (PTY) LTD, Muldersdrift, Gauteng (ZA)

(72) Inventor: Karl-Heinz Schmitt, Benoni (ZA)

(73) Assignee: Integrated Pool Products (Pty) Ltd, Muldersdrift, Gauteng (ZA)

( * ) Notice: Subject to any disclaimer, the term of this patent is extended or adjusted under 35 U.S.C. 154(b) by 339 days.

(21) Appl. No.: 15/522,718

(22) PCT Filed: Oct. 30, 2015

(86) PCT No.: PCT/IB2015/058392
§ 371 (c)(1),
(2) Date: Apr. 27, 2017

(87) PCT Pub. No.: WO2016/067258
PCT Pub. Date: May 6, 2016

(65) Prior Publication Data
US 2017/0321442 A1 Nov. 9, 2017

(30) Foreign Application Priority Data

Oct. 30, 2014  (ZA) ................................ 2014/07907
Nov. 4, 2014   (ZA) ................................ 2014/08035
Jan. 19, 2015  (ZA) ................................ 2015/00356

(51) Int. Cl.
*E04H 4/16*    (2006.01)
*F16H 3/14*    (2006.01)
(Continued)

(52) U.S. Cl.
CPC ........... *E04H 4/1654* (2013.01); *F16D 11/10* (2013.01); *F16D 11/14* (2013.01); *F16D 21/04* (2013.01);
(Continued)

(58) Field of Classification Search
CPC ........ E04H 4/1654; F16D 11/10; F16D 11/14; F16D 21/04; F16D 23/12; F16D 2023/123; F16H 3/14; Y10T 74/19488
See application file for complete search history.

(56) References Cited

U.S. PATENT DOCUMENTS 5,435,031 A * 7/1995 Minami ................ E04H 4/1654
                                              15/1.7
5,507,058 A    4/1996 Minami et al.
(Continued)

OTHER PUBLICATIONS

International Search Report issued in co-pending International Patent Application No. PCT/IB2015/058392, Austrian Patent Office, dated Jan. 26, 2016, 4 pages.
(Continued)

*Primary Examiner* — Richard M Lorence
(74) *Attorney, Agent, or Firm* — McDonnell Boehnen Hulbert & Berghoff LLP (57) ABSTRACT

The invention relates to a pool cleaner. Rotation from a turbine is transmitted to a first wheel that is forwardly driven. A second wheel is switched between corresponding forward rotation and rearward rotation. An axle of the first wheel rotatably supports a sleeve that carries the second wheel. The reverse transmission is effected by a double-sided dog clutch member slidably supported between a pair of clutch gears freely rotatable on a rotating lay shaft. A first clutch gear is connected for reverse rotation and a second clutch gear for forward rotation of the sleeve. A switching mechanism includes a movably mounted lever arm engaging the double-sided clutch member with a cam follower engaging a cam formation carried on an independently supported control gear connected to the turbine and in mesh with a worm gear on the lay shaft.

17 Claims, 5 Drawing Sheets

(51) Int. Cl.
*F16D 23/12* (2006.01)
*F16D 21/04* (2006.01)
*F16D 11/14* (2006.01)
*F16D 11/10* (2006.01)

(52) U.S. Cl.
CPC ............... *F16D 23/12* (2013.01); *F16H 3/14* (2013.01); *Y10T 74/19488* (2015.01)

(56) References Cited

U.S. PATENT DOCUMENTS

| | | | |
|---|---|---|---|
| 6,094,764 A * | 8/2000 | Veloskey | ............... E04H 4/1654 15/1.7 |
| 2008/0125943 A1 | 5/2008 | Finezilber | |
| 2012/0210527 A1* | 8/2012 | Erlich | ................... E04H 4/1654 15/1.7 |
| 2014/0115796 A1 | 5/2014 | Sebor et al. | |

OTHER PUBLICATIONS

Written Opinion issued in co-pending International Patent Application No. PCT/IB2015/058392, Austrian Patent Office, dated Jan. 26, 2016, 3 pages.

\* cited by examiner

POOL CLEANER DRIVE MECHANISM

CROSS-REFERENCE TO RELATED APPLICATIONS

This application is a National Stage Application of International Patent Application No. PCT/IB2015/058392, filed Oct. 30, 2015, which claims the benefit of, and priority to, South African Patent Application No. 2014/07907, filed Oct. 30, 2014, South African Patent Application No. 2014/08035, filed Nov. 4, 2014, and South African Patent Application No. 2015/00356, filed Jan. 19, 2015. The contents of these applications are incorporated entirely herein by reference.

FIELD OF THE INVENTION

This invention relates to a two wheel drive system including means for automatically, intermittently changing direction of the drive.

BACKGROUND TO THE INVENTION

Automatic swimming pool cleaners are machines which are required to move over submerged surfaces to be cleaned in a random manner to ensure proper cleaning of those surfaces. These cleaners are frequently driven by mechanisms which utilize the power derived from water flow arising in the filter plants used to maintain clarity of the pool water. These power supply sources are commonly provided as turbine assemblies driven by a swimming pool filtration pump.

By and large these pool cleaners avoid a great deal of manual labour without increasing the maintenance costs for domestic pools. However they still require some control to ensure that the entire submerged surfaces are kept clear because they often are not sufficiently random in their movement and also can be stopped by obstacles encountered in their movements.

OBJECT OF THE INVENTION

It is the object of this invention to provide a pool cleaner which avoids to an appreciable extent the difficulties presently experienced with the majority of cleaners of this kind that are presently available. It is also anticipated that the mechanism disclosed in this specification can find other applications, particularly in pool cleaners which have as a power supply source something other than a turbine assembly.

SUMMARY OF THE INVENTION

According to this invention there is provided a pool cleaner drive mechanism comprising:
 a pair of wheels supported by a chassis,
 a forward first driven gear connected through an axle to a first wheel and
 a second driven gear fixed to a lay shaft carrying a double-sided dog clutch member slidable between a pair of clutch gears freely rotatable on the lay shaft and providing cooperating dog clutch formations,
 a first clutch gear of the pair connected for reverse rotation of an axle component carrying a second wheel and
 a second clutch gear connected for forward rotation of the axle component carrying the second wheel,
with a switching mechanism connected to shift the dog clutch member between engagement with the first and second clutch gears respectively to control rotational direction of the second wheel.

The invention further provides that the axle of the first wheel includes a coaxial shaft which rotatably supports a sleeve providing the axle component that carries the second wheel.

The invention further provides that a movably mounted lever arm engaging the double-sided clutch member and including a cam follower engaged with a cam formation carried on an independently supported control gear in mesh with a worm gear on the lay shaft for shifting of the double-sided clutch member between engagement with the respective first and second clutch gears.

Further features of the invention provide that the lever arm includes a yoke at one end located in a central groove around the double-sided dog clutch member; and where the lever arm is pivotably connected to the chassis at an end opposite the dog clutch member.

Further features of the invention provide that the cam formation is substantially circular with at least one recessed portion to switch the double-sided dog clutch member; further that the cam formation is provided by a ridge on the control gear; still further that the cam formation is provided by a pair of ridges on the control gear and the follower is provided with a pin that runs along the ridges.

The invention further provides that the first clutch gear is connected with a driven reverse gear secured to the axle component carrying the second wheel and the second clutch gear is geared directly to a forward drive gear also secured to the axle component.

Further features of the invention provide that the first and second clutch gears are respectively a pulley connected to the driven reverse gear and a gear connected to the forward drive gear; further that a reverse gear drive is provided as a belt drive extending between the pulley on the lay shaft and a pulley on the driven reverse gear on the sleeve.

The invention further provides that the first and second clutch gears are respectively a gear connected through an intermediary gear to the driven reverse gear and a gear connected to the forward drive gear; that the second driven gear of the lay shaft meshes with a drive gear on the axle.

A further aspect of the invention provides that a gear chain connected to a water turbine terminates in the first driven gear.

The invention further provides that the fluid driven turbine has a flow path from an inlet to an outlet through one side of the housing, an eccentrically mounted rotor in the housing having a circular array of turbine blades supported between end plates with each blade having an inner edge that is spaced radially outwardly from an axis of the rotor defining a central cavity between the blades.

Further features of the invention provide that the blades are curved forwardly between inner and outer ends; more that outer ends of the blades are located at or adjacent a periphery of the round end plates.

BRIEF DESCRIPTION OF THE INVENTION

These and other features of the invention will become apparent from the following description of embodiments, made by way of example only, with reference to the accompanying drawings in which.

DETAILED DESCRIPTION OF THE INVENTION

Referring to the drawings, a preferred embodiment of a pool cleaner (101) has a chassis (102) supported on front and rear pairs of wheels (103) and (104) which are connected by rubber tracks (105) with surface engaging tread.

Figure 1:
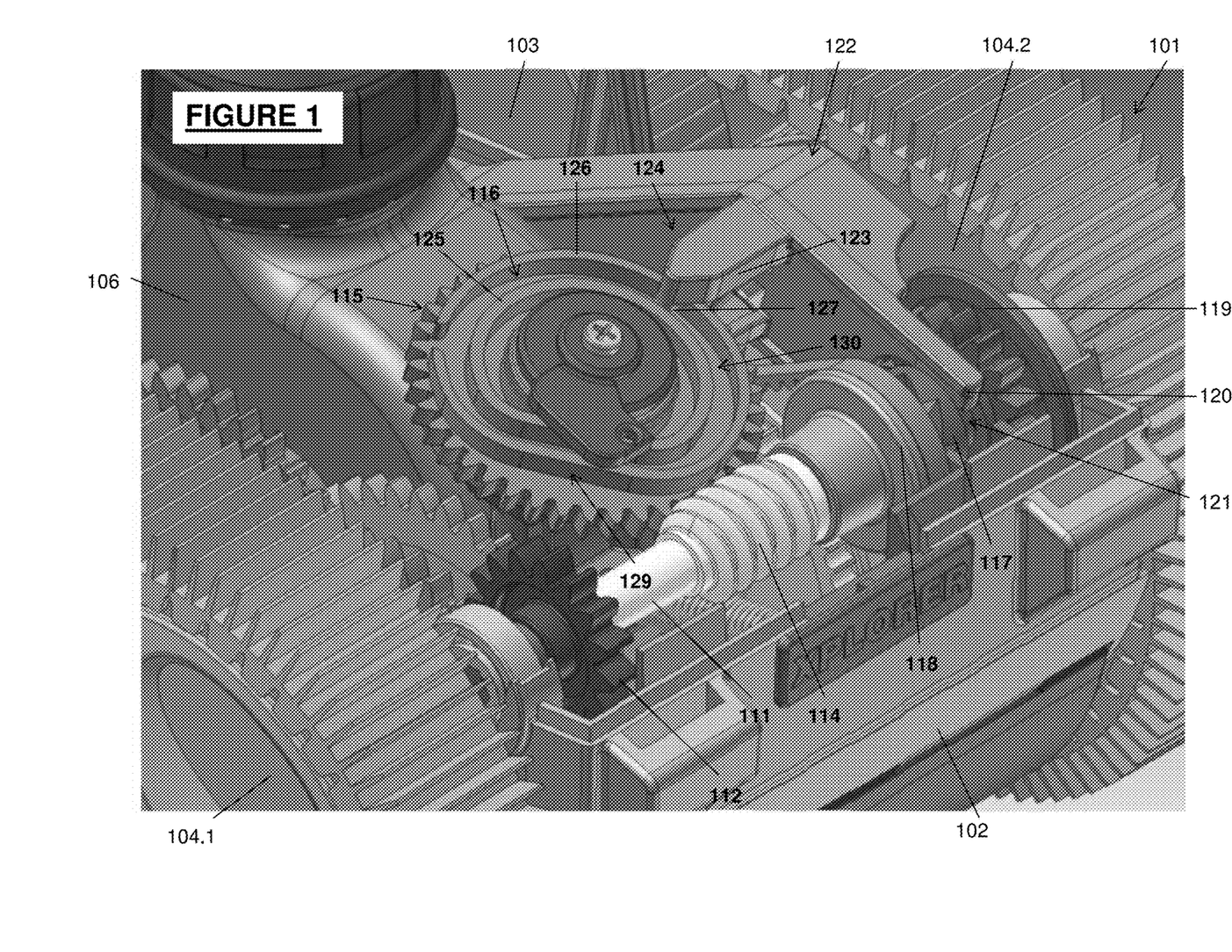
FIG. 1 shows a rear perspective view of a part of a pool cleaner with its cover removed.

The front wheels (103) are fixedly mounted on a rotatable front axle (not shown) supported on the chassis (102). (Only part of one of the front wheels (103) is shown in FIG. 1.)

The cleaner (101) is powered by a turbine assembly (described below with reference to FIG. 4) having a housing (106). A power take-off is provided in the form of a chain of gears terminating in a (first) driven gear (108) fixedly mounted on a rear axle (109). This is shown more clearly in FIG. 2.

Figure 2:
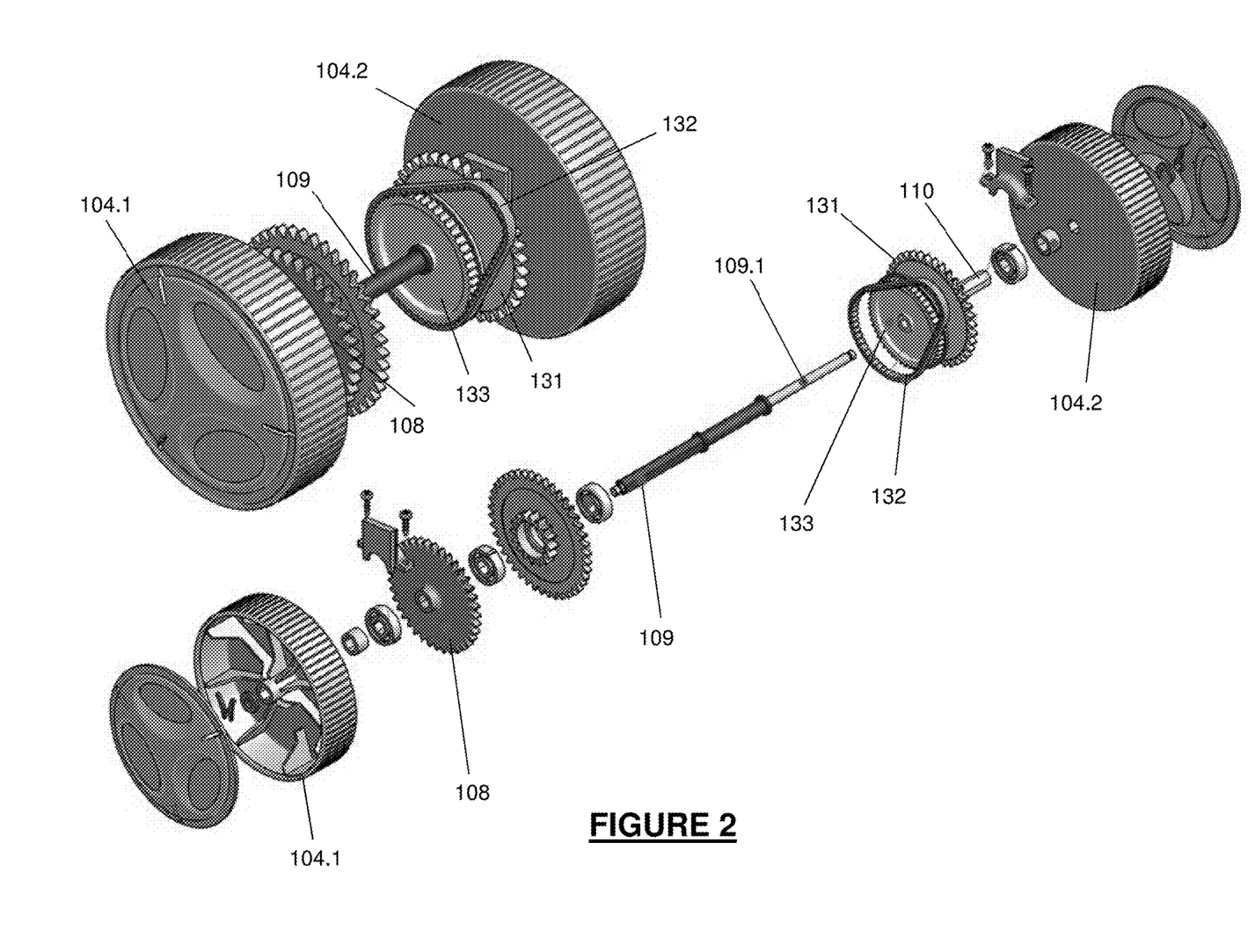
FIG. 2 shows perspective views of a rear axle with its components assembled and exploded.

The left rear wheel (104.1) is secured to rotate with the axle (109) in a forward direction and the right rear wheel (104.2) fixedly mounted on a sleeve (110) rotatable on the axle (109). A shaft (109.1) from the axle (109) extends through the sleeve (110). The axle (109) and sleeve (110) are rotatably supported on the chassis (102) in suitable bearings.

A lay shaft (111) carrying a fixed (second driven) gear (112) meshing with the driven gear (108) is also supported across the chassis (102) in bearings. This is shown separately in FIG. 3.

Figure 3:
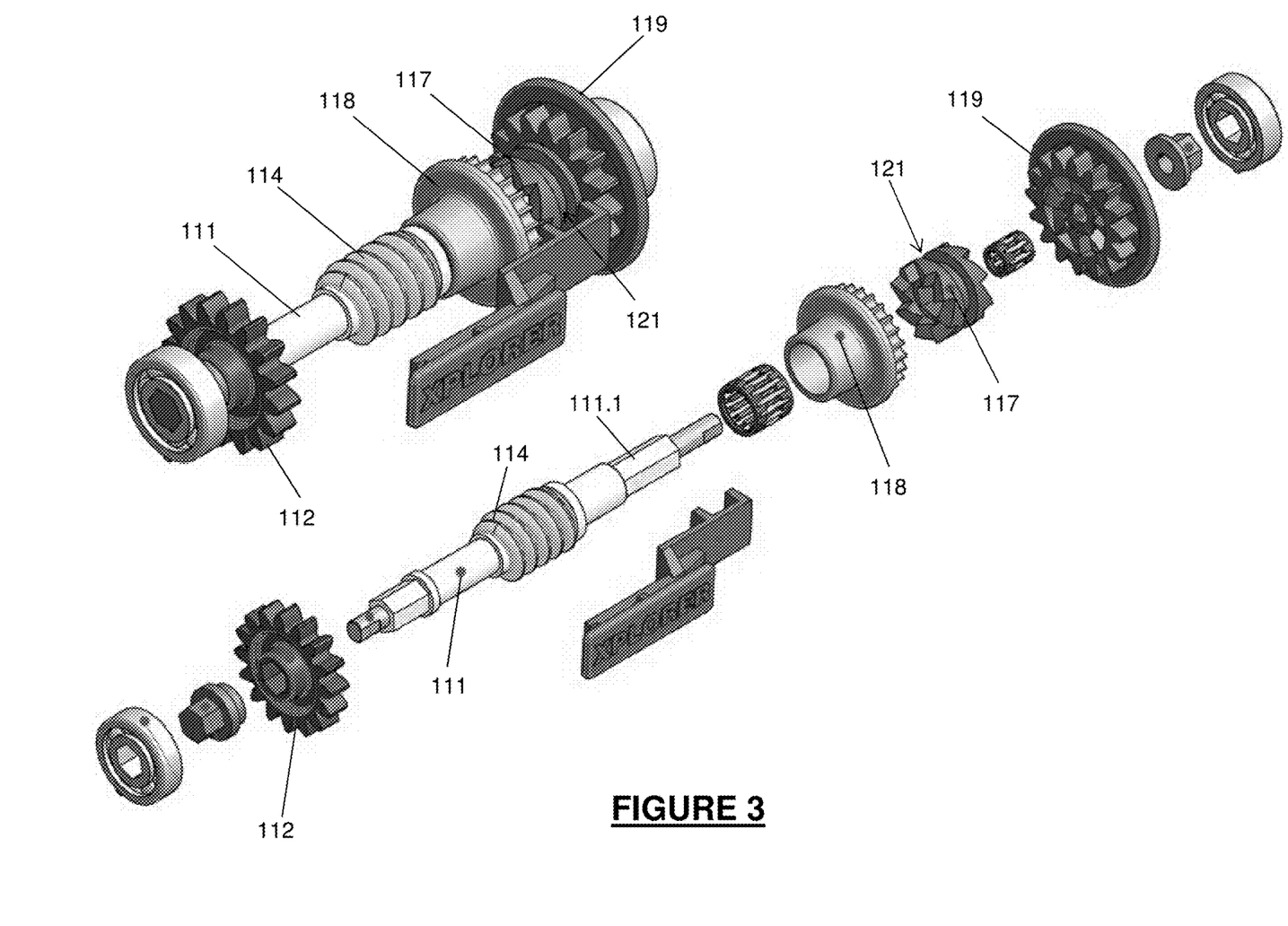
FIG. 3 shows perspective views of a lay shaft with its components assembled and exploded.

A worm gear (114) located on the lay shaft (111) approximately midway along its length meshes with a control gear (115) carrying a cam formation (116). The gear (115) is rotatably supported from the housing (106) of the turbine assembly so it can be driven by the worm gear (114).

The lay shaft (111) supports a double-sided dog clutch member (117) which is non-rotatably slidable on the shaft (111) between two freely rotatable clutch engaging transmission gears (118) and (119). In this embodiment, the first clutch gear (118) is provided as a pulley.

The clutch gears (118) and (119) provide inwardly disposed engagement formations for the dog clutch member (117). The contacting faces between the double-sided dog clutch member (117) and the pulley (118) and gear (119) are preferably rings of tapered coupling teeth (providing as ratchet plates).

The dog clutch member (117) has a hexagonal bore to slide on a complementarily shaped section (111.1) of the lay shaft (111). The clutch member (117) can move to respectively engage one or other set of tooth formations on the pulley (18) or gear (119) to cause combined rotation of that pulley/gear with the clutch member (117). Both clutch gears (118) and (119) are free to rotate on the lay shaft (111) when not engaged with the clutch member (117).

To effect this axial movement of dog clutch member (117) a yoke (120) is provided to engage a circumferential groove (121) in the member (117). The yoke (120) is mounted on the working end of a lever or pivoting arm (122) which has its opposite end pivotably supported in a mounting secured to the chassis (102).

A lateral branch (123) extends from the lever arm (122) to form a cam follower (124) positioned to engage the cam formation (116) on the control gear (115). The cam formation is provided as a track (116) by spaced apart ridges (125; 126) on the control gear (115) and the follower (124) includes a pin (127) that runs between the ridges (125; 126). An opening (128) in the outer ridge (125) of the track (116) allows for insertion of the pin (127).

The cam formation (116) is substantially circular with a substantially flat, recessed portion (129) deviating along a chord from a circular portion (130) of the track. Thus as the cam formation (116) is rotated by the worm gear (114) the yoke (120) moves to change the engagement of the clutch member (117) between the pulley (118) and the gear (119).

When the follower (124) is running along the circular portion (130) of the track (116) the lever arm (122) is supported with the clutch member (117) engaged in the gear (119). This gear (119) is then caused to rotate a drive gear (131) which is secured to the sleeve (110) and drive the right hand wheel (104.2) forwardly at the same rate that the left hand wheel (104.1) is driven by the gear train from the turbine assembly.

A belt drive connects the output pulley (118) of the clutch member (117) to the sleeve (110). The pulley (118) is accordingly fitted with a flexible belt (132) which will drive a second reverse direction pulley (133) on the sleeve (110). When the cam follower (124) transitions from the circular portion (130) into the recessed portion (129) of the track (116) the lever arm (122) shifts the clutch member (117) into engagement with the pulley (118) which drives the right hand rear wheel (104) in the reverse direction.

The mechanism described may be varied by having a gear as the first clutch gear (118), instead of a pulley, which engages a reverse gear on the sleeve (110) through an intermediate gear (instead of the belt).

It will also be appreciated that the two ridges (125; 125) of the track (116) need to overlap where a transition is made by the cam follower (124) [from the outside of the inner ridge, supporting the follower away from the axis of the control gear, to the inside of the outer ridge supporting the follower close to the axis of the control gear] but that a single separate ridge (either inner or outer, as appropriate) will be suitable between the transition regions. In other words, with reference to the current embodiment, the inner ridge (125) must extend along the circular portion and the outer ridge (126), along the recess portion (with the necessary overlap).

Figure 4:
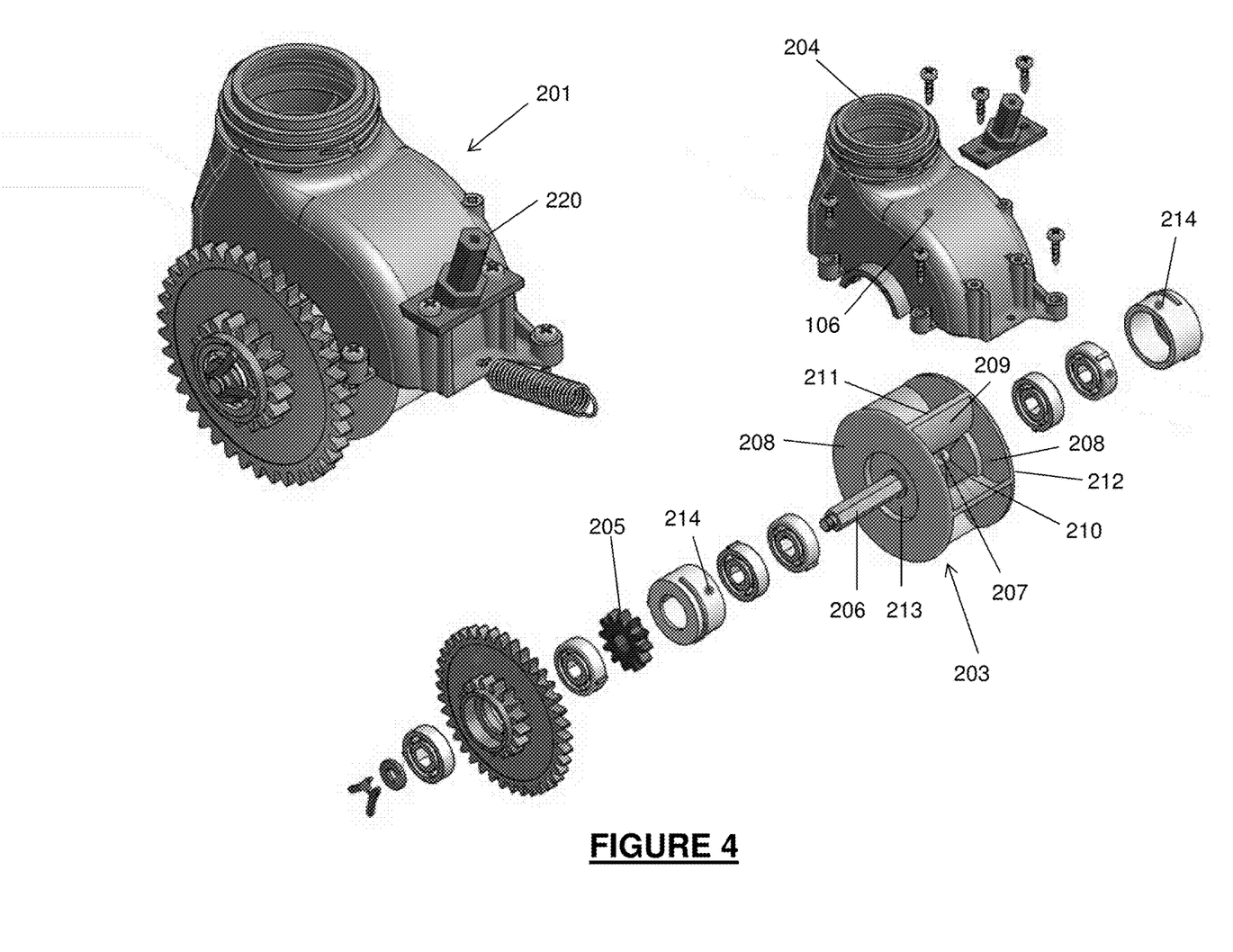
FIG. 4 shows a perspective view of the turbine assembly housing and an exploded view of the assembly components.

Referring to FIG. 4, a water turbine assembly (201) of the pool cleaner consists of the housing (106) and a rotor (203). The rotor (203) is offset from an axis of an outlet (204) and an inlet (which is provided through a bottom panel secured to the chassis, in-line with the outlet). The fluid driven turbine assembly (201) accordingly has a flow path from the inlet to the outlet (204) through one side of the housing (106). The rotor (203) is mounted eccentrically in the housing (106) to one side of the flow path.

The rotor (203) has a take-off shaft (206). The shaft (206) is provided as an extension of an axle (207) that passes through the rotor (203) and also protrudes to the opposite side (not shown). The axle (207) is supported in suitable bearing arrangement, as described below. The take-off shaft (206) has a fixed output gear (205) connected to the gear train, which serves to drive the pool cleaner.

The rotor (203) has round end plates (208) that support a series of blades (209)—in this embodiment these components are moulded integrally. The blades (209) are provided as a circular array with each blade (209) spaced radially outwardly from the axle (207) of the rotor (203).

The blades (209) each have an inner edge (210) that is spaced radially outwardly from an axis of the rotor (203) defining a central cavity between the blades (209). The blades (209) are curved forwardly between inner (210) and outer (211) edges with the outer edges (211) located at or adjacent a periphery (212) of the end plates (208).

The housing is constructed with the illustrated upper half (106) and a lower half (formed onto the chassis) that are secured together with the turbine rotor (203) inside. The rotor (203) is provided with centrally located side recesses (213) formed into the end plates (208). Corresponding cups (214) are provided for engagement between the two halves of the housing. A pair of bearings is mounted inside the enclosed space provided by the recesses (213) and cups (214) on each side of the rotor (203).

A spline on each bearing casing locates in a key provided in the cups (214) to prevent rotation. Longitudinal splines and lateral ribs on the cups (214) provide for secure location through engagement in corresponding formations on the two halves of the housing.

A spigot (220) mounted on the housing (202) supports a bearing for the control gear (115) shown in FIG. 1.

Figure 5:
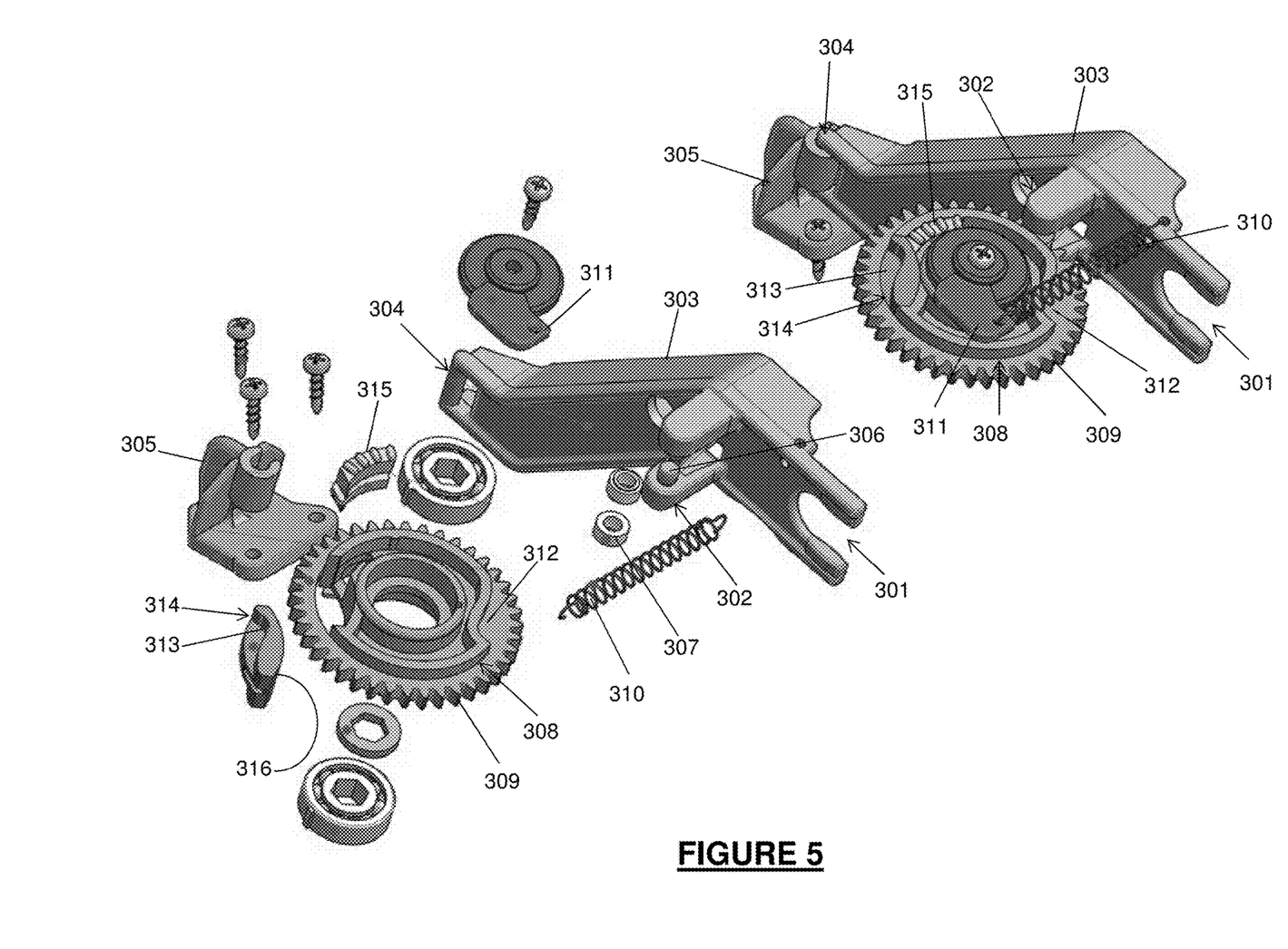
FIG. 5 shows a perspective and exploded view of an alternative embodiment of a pivoting arm.

An alternative embodiment of the clutch switching mechanism is shown in FIG. 5. A yoke (301) and cam follower (302) are similarly carried on a lever arm (303) having an end (304) pivotally supported in a mounting (305) to enable the yoke (301) at the free, operative end to move a double-sided dog clutch member (117, in FIG. 3) in the manner and for the purpose described above.

The follower (302) has a forked configuration with a pair of inwardly extending pins (306) fitted with rollers (307) to engage against the outside of a cam formation (308) on a control gear (309).

A tension spring (310) is connected between the arm (303) and an anchor provided on a lug (311) extending from a washer to project radially from an axis of control gear (309). The lug (311) may be adjusted to vary the distance between the ends of the spring (310) and thus the force applied to the arm (303).

The cam (308) in this embodiment has a first recess (312) and a second oppositely disposed recess (313). The arrangement provides for engagement of the clutch member (117) with the pulley (118, in FIG. 3) twice for each rotation of the control gear (309). The second recess (313) is provided on an insert (314). A slidable clip (315) carried on the gear (309) secures the insert (314) in place. When released by the clip (315), the insert (314) can be removed, rotated and replaced. An opposite profile (316) of the insert (314) presents a curved shoulder continuous with the ridge of the cam (308). With the arrangement so configured, the clutch member (117) is switched only once per revolution of the control gear (309).

As a further alternative, to effect the axial movement required to switch the double-sided dog clutch member, a yoke may be provided on an end of a beam (instead of a pivoting lever arm) which is slidable along a rail provided on the turbine housing parallel to the lay shaft and perpendicular to the beam. The beam is also resiliently biased with a follower to engage the cam formation on the control gear. To this end, a tension spring is similarly provided between the yoke and an anchor on an end of the rail.

It will be appreciated that the position of the forward and rearward rotation clutch gears on the lay shaft can be switched (with corresponding changes to the connection to the sleeve that carries the right hand rear wheel). In such a case, the cam formation will have an outward portion (instead of a recess) that switches the wheel to reverse rotation.

In use the pool cleaner has been found to comprehensively cover and keep clean submerged surface and to avoid being trapped by changes in wall and floor surfaces. This has been due to the ability of the cleaner to have one rear wheel which periodically changes from forward to reverse drive. This positively drives the cleaner away from obstacles in the direct line of movement and, where necessary, facilitates dislodgement from obstacles that have been encountered.

The turbine has been found to provide favourable or sufficient power to drive the wheels and its configuration adequately permits the passage of debris through the housing.

It will be appreciated that additional modifications to the embodiments of the invention above described can be made by competent persons to obtain different cleaning patterns on submerged surfaces and to the components necessary for such variations without departing from the scope of this invention. For example, the lever arm and/or dog clutch member may be operated by alternative means to the worm and control gears associated with the lay shaft. The lay shaft may also have a separate drive chain connected to the turbine output shaft, for example.

We claim:

1. A pool cleaner drive mechanism comprising:
   a pair of wheels supported by a chassis,
   a forward first driven gear connected through an axle to a first wheel and
   a second driven gear fixed to a lay shaft carrying a double-sided dog clutch member slidable between a pair of clutch gears freely rotatable on the lay shaft and providing cooperating dog clutch formations,
   a first clutch gear of the pair connected for reverse rotation of an axle component carrying a second wheel and
   a second clutch gear connected for forward rotation of the axle component carrying the second wheel,
   with a switching mechanism connected to shift the dog clutch member between engagement with the first and second clutch gears respectively to control rotational direction of the second wheel.

2. A mechanism as claimed in claim 1 in which the axle of the first wheel includes a coaxial shaft which rotatably supports a sleeve providing the axle component that carries the second wheel.

3. A mechanism as claimed in claim 2 in which the first clutch gear is connected with a driven reverse gear secured to the axle component carrying the second wheel and the second clutch gear is geared directly to a forward drive gear also secured to the axle component.

4. A mechanism as claimed in claim 3 in which the first and second clutch gears are respectively a pulley connected to the driven reverse gear and a gear connected to the forward drive gear.

5. A mechanism as claimed in claim 4 in which a reverse gear drive is provided as a belt drive extending between the pulley on the lay shaft and a pulley on the driven reverse gear on the sleeve.

6. A mechanism as claimed in claim 3 in which the first and second clutch gears are respectively a gear connected through an intermediary gear to the driven reverse gear and a gear connected to the forward drive gear.

7. A mechanism as claimed in claim 1 which includes a movably mounted lever arm engaging the double-sided clutch member and including a cam follower engaged with a cam formation carried on an independently supported control gear in mesh with a worm gear on the lay shaft for shifting of the double-sided clutch member between engagement with the respective first and second clutch gears.

8. A mechanism as claimed in claim 7 in which the lever arm includes a yoke at one end located in a central groove around the double-sided dog clutch member.

9. A mechanism as claimed in claim 8 in which the lever arm is pivotably connected to the chassis at an end opposite the dog clutch member.

10. A mechanism as claimed in claim 9 in which the cam formation is substantially circular with at least one recessed portion to switch the double-sided dog clutch member.

11. A mechanism as claimed in claim 10 in which the cam formation is provided by a ridge on the control gear.

12. A mechanism as claimed in claim 11 in which the cam formation is provided by a pair of ridges on the control gear and the follower is provided with a pin that runs along the ridges.

13. A mechanism as claimed in claim 1 in which the second driven gear of the lay shaft meshes with a drive gear on the axle.

14. A mechanism as claimed in claim 1 in which a gear chain connected to a water turbine terminates in the first driven gear.

15. A mechanism as claimed in claim 14 in which the turbine has a flow path from an inlet to an outlet through one side of a housing, an eccentrically mounted rotor in the housing having a circular array of turbine blades supported between end plates with each blade having an inner edge that is spaced radially outwardly from an axis of the rotor defining a central cavity between the blades.

16. A mechanism as claimed in claim 15 in which the blades are curved forwardly between inner and outer ends.

17. A mechanism as claimed in claim 16 in which outer ends of the blades are located at or adjacent a periphery of the round end plates.

* * * * *